US012753308B2

(12) United States Patent
Hiroki et al.

(10) Patent No.: US 12,753,308 B2
(45) Date of Patent: Oct. 6, 2026

(54) POLYAMIDE RESIN COMPOSITION

(71) Applicant: UBE CORPORATION, Ube (JP)

(72) Inventors: Tetsuro Hiroki, Ube (JP); Tetsuya Yasui, Ube (JP)

(73) Assignee: UBE CORPORATION, Ube (JP)

( * ) Notice: Subject to any disclaimer, the term of this patent is extended or adjusted under 35 U.S.C. 154(b) by 899 days.

(21) Appl. No.: 17/773,280

(22) PCT Filed: Oct. 28, 2020

(86) PCT No.: PCT/JP2020/040426

§ 371 (c)(1),
(2) Date: Apr. 29, 2022

(87) PCT Pub. No.: WO2021/085472

PCT Pub. Date: May 6, 2021

(65) Prior Publication Data

US 2023/0131836 A1 Apr. 27, 2023

(30) Foreign Application Priority Data

Oct. 30, 2019 (JP) ................................ 2019-197098

(51) Int. Cl.

*C08L 77/06* (2006.01)
*B29C 49/00* (2006.01)
*B29K 77/00* (2006.01)
*C08J 5/18* (2006.01)

(52) U.S. Cl.

CPC ................ *C08L 77/06* (2013.01); *C08J 5/18* (2013.01); *B29C 49/0005* (2013.01); *B29K 2077/00* (2013.01); *C08J 2377/06* (2013.01); *C08J 2415/00* (2013.01); *C08J 2423/08* (2013.01); *C08L 2201/08* (2013.01); *C08L 2203/16* (2013.01); *C08L 2205/03* (2013.01)

(58) Field of Classification Search

CPC ............ B29C 49/0005; B29K 2077/00; C08J 2377/06; C08J 2415/00; C08J 2423/08; C08J 5/18; C08K 5/134; C08K 5/526; C08K 5/5393; C08L 2201/08; C08L 2203/16; C08L 2205/03; C08L 23/0876; C08L 51/06; C08L 77/02; C08L 77/06

See application file for complete search history.

(56) References Cited

U.S. PATENT DOCUMENTS

| | | | | |
|---|---|---|---|---|
| 2006/0030692 A1 | 2/2006 | Montanari et al. | | |
| 2016/0176232 A1* | 6/2016 | Brace | B32B 27/16 156/110.1 | |
| 2021/0347991 A1 | 11/2021 | Yasui et al. | | |

FOREIGN PATENT DOCUMENTS

| | | | |
|---|---|---|---|
| EP | 3 725 848 | A1 | 10/2020 |
| JP | 11-245927 | A | 9/1999 |
| JP | 2001-11305 | A | 1/2001 |
| JP | 2007-204674 | A | 8/2007 |
| JP | 2007-204675 | A | 8/2007 |
| JP | 2008-503631 | A | 2/2008 |
| JP | 2012-92290 | A | 5/2012 |
| JP | 2013-203869 | A | 10/2013 |
| JP | 2013-249363 | A | 12/2013 |
| JP | 2020-41132 | A | 3/2020 |
| JP | 2020-117637 | A | 8/2020 |
| WO | WO2019/117072 | A1 | 6/2019 |

OTHER PUBLICATIONS

Extended European Search Report dated Oct. 6, 2023 for Application No. 20883137.0.

International Search Report (PCT/ISA/210) issued in PCT/JP2020/040426 mailed on Jan. 26, 2021.

* cited by examiner

*Primary Examiner* — Ana L. Woodward

(74) *Attorney, Agent, or Firm* — Birch, Stewart, Kolasch & Birch, LLP

(57) ABSTRACT

This is to achieve low temperature toughness in a blow molded product, blow molding properties such as mold transferability, suppression of burning, suppression of surface unevenness, drawdown property and dimensional stability of the blow molded product, and blister resistance in combination.

A polyamide resin composition of the present invention comprises 60 to 85% by mass of a polyamide resin (A), 20% by mass or more of an olefin-based ionomer (B) and 5 to 20% by mass of an impact resistant material (C) in 100% by mass of the polyamide resin composition, and contains 20% by mass or more of an aliphatic copolymerized polyamide (A-1) in 100% by mass of the polyamide resin (A).

12 Claims, 1 Drawing Sheet

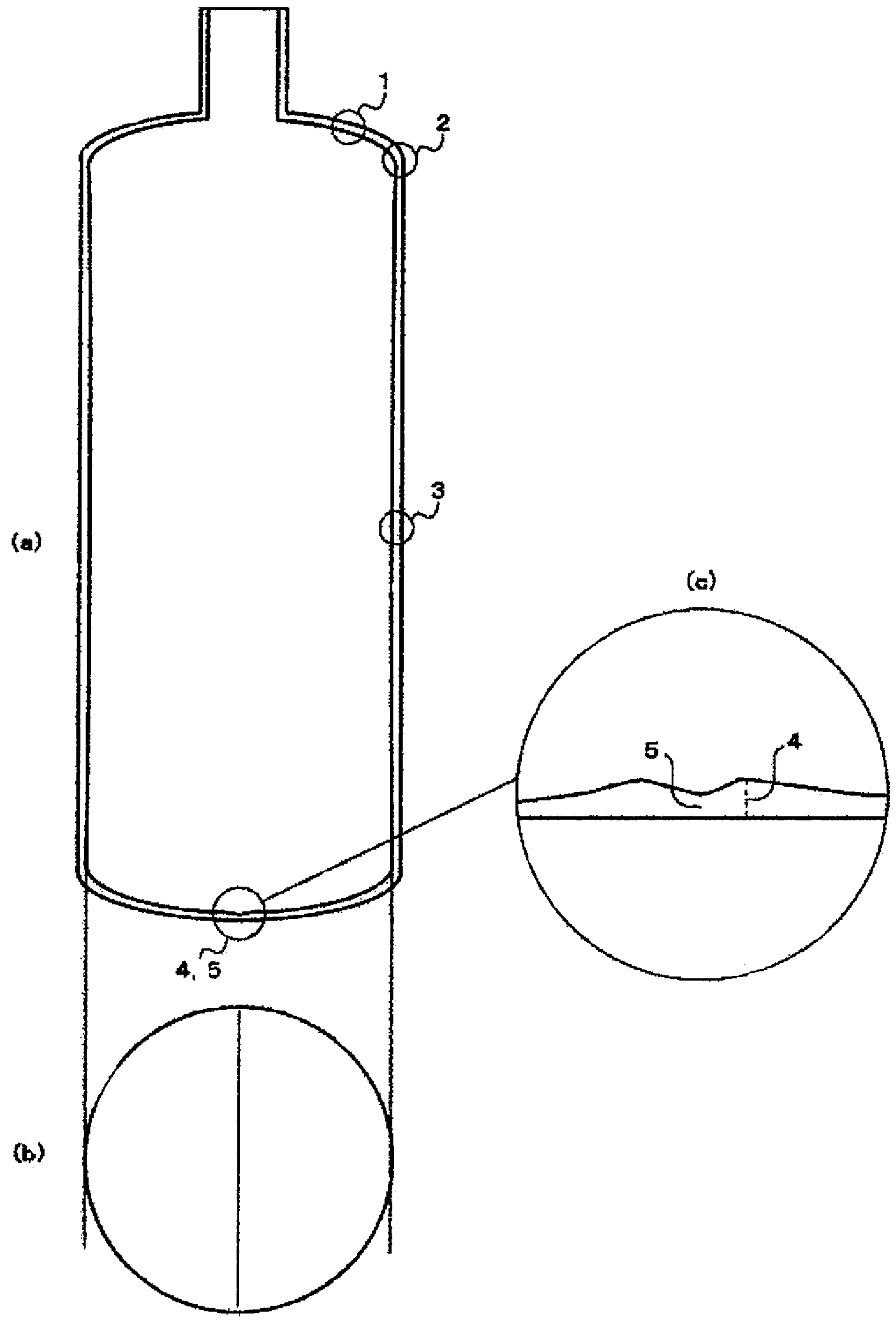
1
2
3
(a)
(c)
5
4
4, 5
(b)

POLYAMIDE RESIN COMPOSITION

TECHNICAL FIELD

The present invention relates to a polyamide resin composition.

BACKGROUND ART

Polyamide resins have excellent mechanical characteristics, heat resistance and chemical resistance, so that are developed in various uses as engineering plastics, and used by various molding methods. Among them, utilization as a blow molded product by blow molding is also progressing. In FCV (fuel cell vehicle), which are expected to expand rapidly in the future, a large sized blow molded product for charging a fuel has been required.

It has been known that a polyamide resin composition in which a polyphenylene sulfide resin, an ethylene-based ionomer resin and an olefin-based elastomer resin are added to a polyamide resin is excellent in blow molding property, low temperature toughness and barrier property (for example, see Patent Document 1). Also, it has been known that a polyamide resin composition comprising 6-66 copolymerized nylon and a modified polyolefin is excellent in flexibility, gas barrier property and blow molding property (for example, see Patent Document 2).

PRIOR ART DOCUMENT

Patent Document

Patent Document 1: JP 2007-204675A
Patent Document 2: JP Hei.11-245927A

SUMMARY OF THE INVENTION

Problems to be Solved by the Invention

When an impact resistant material such as an olefin-based elastomer resin, etc., is formulated with a polyamide resin, it has been known that drawdown property and low temperature toughness are improved, but on the other hand, there are problems that mold transferability, burning, unevenness of inner surface, dimensional stability and blister resistance of the blow molded product are inferior.

In these Patent Documents 1 and 2, it is confirmed that the wall thickness of the molded product is not deviated as a whole as the dimensional stability of the blow molding property. In the blow molded products, the wall thickness of the welded portion tends to be particularly thin, and when the blow molded product is used in a high-pressure gas tank, etc., that is required to have blister resistance and mechanical characteristics at extremely low temperatures, there are problems that cracks occur in this welded portion and it is fragile. Accordingly, the blow molded product is required that, in addition to that it is no deviation in the wall thickness as a whole, the wall thickness of the welded portion does not become thinner as compared with that of the other parts.

Accordingly, an object of the present invention is to achieve, in blow molded products, low temperature toughness, blow molding properties (drawdown property, and mold transferability, suppression of burning, suppression of inner surface unevenness and dimensional stability of the blow molded product) and blister resistance in combination.

Means to Solve the Problems

The present invention is, for example, the following [1] to [7].

[1] A polyamide resin composition which comprises 60 to 85% by mass of a polyamide resin (A), 5 to 20% by mass of an olefin-based ionomer (B) and 5 to 20% by mass of an impact resistant material (C) in 100% by mass of the polyamide resin composition, and contains 20% by mass or more of an aliphatic copolymerized polyamide (A-1) in 100% by mass the polyamide resin (A).

[2] The polyamide resin composition of [1], which further comprises 0.1 to 3% by mass of a heat resistant agent (D).

[3] The polyamide resin composition of [1] or [2], wherein an aliphatic homopolyamide (A-3) in 100% by mass of the polyamide resin (A) is less than 75% by mass.

[4] The polyamide resin composition of any of [1] to [3], wherein the aliphatic copolymerized polyamide (A-1) contains at least one kind selected from the group consisting of polyamide 6/66 and polyamide 6/66/12.

[5] The polyamide resin composition of any of [1] to [4], wherein a relative viscosity of the aliphatic copolymerized polyamide (A-1) measured in accordance with JIS K 6920 is 3.0 or more.

[6] The polyamide resin composition of any of [1] to [5], wherein an MFR of the olefin-based ionomer (B) measured in accordance with JIS K7210 (1999) at 190 °C and a load of 2.16 kg is 2 g/10 min or less.

[7] The polyamide resin composition of any of [1] to [6], wherein an MFR of the impact resistant material (C) measured in accordance with ASTM D1238 at 190 °C and a load of 2.16 kg is 2 g/10 min or less.

[8] A blow molded product of the polyamide resin composition of any of [1] to [7].

[9] A molded product of the polyamide resin composition of any of [1] to [7], which is a molded product which is in contact with a high-pressure gas having a shape selected from the group consisting of a tank, a tube, a hose and a film.

Effects of the Invention

The polyamide resin composition of the present invention can make blow molding properties (drawdown property, and mold transferability, suppression of burning, suppression of surface unevenness and dimensional stability of the blow molded product), low temperature toughness and blister resistance stand side by side.

BRIEF DESCRIPTION OF THE DRAWINGS

FIG. 1 shows a cylindrical shape 3-liter bottle which is a blow molded product, FIG. 1(*a*) is a vertical sectional view of the whole, FIG. 1(*b*) is a top view of the bottom part, and FIG. 1(*c*) is a partial enlarged view of a welded portion and its vicinity at the bottom part.

EMBODIMENTS TO CARRY OUT THE INVENTION

The present invention relates to a polyamide resin composition which comprises 60 to 85% by mass of the polyamide resin (A), 5 to 20% by mass of an olefin-based ionomer (B) and 5 to 20% by mass of an impact resistant material (C) in 100% by mass of the polyamide resin composition, and contains 20% by mass or more of an aliphatic copolymerized polyamide (A-1) in 100% by mass of the polyamide resin (A).

(A) Polyamide Resin

The polyamide resin composition contains the polyamide resin (A).

The polyamide resin (A) contained in the polyamide resin composition contains 20% by mass or more of an aliphatic copolymerized polyamide (A-1) in 100% by mass of the polyamide resin (A), preferably contains 40% by mass or more, more preferably contains 60% by mass or more, further preferably contains 80% by mass or more, and most preferably contains the aliphatic copolymerized polyamide (A-1) alone. By containing the aliphatic copolymerized polyamide (A-1) in the above-mentioned range, the molding temperature can be lowered, and burning suppression and dimensional stability of the blow molded product are excellent.

The polyamide resin (A) may contain at least one kind selected from the group consisting of an aromatic copolymerized polyamide (A-2), an aliphatic homopolyamide (A-3) and an aromatic homopolyamide (A-4) other than the aliphatic copolymerized polyamide (A-1). Among these, an aliphatic homopolyamide is preferable.

(A-1) Aliphatic Copolymerized Polyamide

The aliphatic copolymerized polyamide (A-1) is a polyamide resin comprising two or more kinds of aliphatic constitutional units. The aliphatic copolymerized polyamide (A-1) is a copolymer of monomers selected from the group consisting of a combination of a diamine and a dicarboxylic acid, a lactam and an aminocarboxylic acid. Here, the combination of a diamine and a dicarboxylic acid is deemed to be one kind of a monomer by the combination of one kind of a diamine and one kind of a dicarboxylic acid.

As the diamine, there may be mentioned an aliphatic diamine such as ethylenediamine, tetramethylenediamine, pentamethylenediamine, hexamethylene-diamine, heptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine, eicosanediamine, 2-methyl-1,8-octanediamine, 2,2,4/2,4,4-trimethylhexamethylenediamine, etc.; an alicyclic diamine such as 1,3/1,4-cyclohexyldiamine, bis(4-aminocyclohexyl) methane, bis(4-aminocyclohexyl)propane, bis(3-methyl-4-aminocyclohexyl)methane, (3-methyl-4-aminocyclohexyl) propane, 1,3-/1,4-bisaminomethylcyclohexane, 5-amino-2,2,4-trimethyl-1-cyclopentanemethylamine, 5-amino-1,3,3-trimethylcyclohexanemethyl-amine, bis(aminopropyl) piperazine, bis(aminoethyl)piperazine, norbornanedimethyleneamine, etc. Among these, from the viewpoint of polymerization productivity, at least one kind selected from the group consisting of the aliphatic diamines is preferable, at least one kind selected from the group consisting of linear aliphatic diamines is more preferable, and hexamethylenediamine is further preferable. These diamines may be used one kind alone or may be used in optional combination of two or more kinds.

As the dicarboxylic acid, there may be mentioned an aliphatic dicarboxylic acid such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, etc.; and an alicyclic dicarboxylic acid such as 1,3-/1,4-cyclohexanedicarboxylic acid, dicyclohexanemethane-4,4'-dicarboxylic acid, norbornanedicarboxylic acid, etc. These dicarboxylic acids may be used one kind alone or may be used in optional combination of two or more kinds.

As the lactam, there may be mentioned ε-caprolactam, enantolactam, undecanelactam, dodecanelactam, α-pyrrolidone, α-piperidone, laurolactam, etc. Among these, from the viewpoint of polymerization productivity, at least one kind selected from the group consisting of ε-caprolactam, undecanelactam, dodecanelactam and laurolactam is preferable.

These lactams may be used one kind alone or may be used in optional combination of two or more kinds.

Also, as the aminocarboxylic acids, there may be mentioned 6-aminocaproic acid, 7-aminoheptanoic acid, 9-aminononanoic acid, 11-aminoundecanoic acid and 12-aminododecanoic acid. Among these, from the viewpoint of polymerization productivity, at least one kind selected from the group consisting of 6-aminocaproic acid, 11-aminoundecanoic acid and 12-aminododecanoic acid is preferable.

These aminocarboxylic acids may be used one kind alone or may be used in optional combination of two or more kinds.

As the aliphatic copolymerized polyamide (A-1), there may be specifically mentioned an aliphatic copolymerized polyamide such as caprolactam/hexamethylene-diaminoadipic acid copolymer (polyamide 6/66), caprolactam/hexamethylenediamino-azelaic acid copolymer (polyamide 6/69), caprolactam/hexamethylenediaminosebacic acid copolymer (polyamide 6/610), caprolactamlhexamethylenediaminoundecanoic acid copolymer (polyamide 6/611), caprolactam/hexamethylenediaminododecanoic acid copolymer (polyamide 6/612), caprolactamlaminoundecanoic acid copolymer (polyamide 6/11), caprolactam/laurolactam copolymer (polyamide 6/12), caprolactam/hexamethylenediaminoadipic acid/laurolactam copolymer (polyamide 6/66/12), caprolactam/hexamethylenediaminoadipic acid/hexamethylenediaminosebacic acid copolymer (polyamide 6/66/610), caprolactam/hexamethylenediaminoadipic acid/hexamethylenediaminododecanedicarboxylic acid copolymer (polyamide 6/66/612), etc. The (A-1) aliphatic copolymerized polyamides may be used one kind alone or may be used as a mixture in which two or more kinds are combined.

Among these, those having a low melting point are preferable. If the melting point is low, the molding temperature can be lowered, so that suppression of burning and suppression of unevenness of the inner surface are possible, and the drawdown property becomes good. The melting point is preferably 240 °C or lower, and more preferably 200 °C or lower, which is the value measured by raising the temperature at 20 °C/min under a nitrogen atmosphere in accordance with ISO11357-3 by a differential scanning calorimeter (DSC).

Among these, from the viewpoint of productivity, at least one kind selected from the group consisting of polyamide 6/66, polyamide 6/12 and polyamide 6/66/12 is preferable, at least one kind selected from the group consisting of polyamide 6/66 and polyamide 6/66/12 is more preferable, and polyamide 6/66 is particularly preferable.

Also, from the viewpoint of suppression of burning and drawdown property, in the copolymer containing polyamide 6, a ratio of the polyamide 6 is preferably 60 to 95%.

These (A-1) aliphatic copolymerized polyamides may be each used alone or may be used as a mixture of two or more kinds. When these are used as a mixture of two or more kinds, it is preferable to use polyamide 6/66 as one kind among these from the points of blow molding property and blister resistance.

As the producing device of the aliphatic copolymerized polyamide (A-1), there may be mentioned known polyamide producing devices such as a batch type reaction kettle, a single-tank or multi-tank continuous reaction device, a tubular continuous reaction device, and a kneading reaction extruder including a uniaxial kneading extruder, a twin-screw kneading extruder, etc. As a polymerization method, using known methods such as melt polymerization, solution polymerization or solid phase polymerization, etc., polymerization can be carried out by repeating normal pressure, reduced pressure and pressurization operations. These polymerization methods can be used alone or optionally in combination.

A relative viscosity of the aliphatic copolymerized polyamide (A-1) is preferably 3.0 or more, and more preferably 3.5 or more and 5.0 or less from the viewpoint of molding processability, which is the relative viscosity measured at 25 °C dissolving 1 g of the aliphatic copolymerized polyamide in 100 ml of 96% concentrated sulfuric acid in accordance with JIS K 6920.

A terminal amino group concentration of the aliphatic copolymerized polyamide (A-1) can be obtained by neutralization titration by dissolving in a mixed solvent of phenol and methanol. The terminal amino group concentration of the aliphatic copolymerized polyamide (A-1) is preferably 30 μmol/g or more, and more preferably 30 μmol/g or more and 50 μmol/g or less. If the terminal amino group concentration is within the above-mentioned range, compatibility with an olefin-based ionomer (B) mentioned later becomes good, so that it is preferable from the points of drawdown property, dimensional stability and blister resistance.

(A-2) Aromatic Copolymerized Polyamide

The aromatic polyamide is an aromatic polyamide resin containing at least one component of an aromatic-based monomer component and, for example, is a polyamide resin using an aliphatic dicarboxylic acid and an aromatic diamine, an aromatic dicarboxylic acid and an aliphatic diamine, or an aromatic dicarboxylic acid and an aromatic diamine as starting materials, and obtained by polycondensation of these. The aromatic copolymerized polyamide (A-2) is a polyamide resin comprising two or more kinds of the constitutional units among the above-mentioned aromatic polyamide resins. Here, the combination of the diamine and the dicarboxylic acid is deemed to be one kind of a monomer by the combination of one kind of a diamine and one kind of a dicarboxylic acid.

As the aliphatic diamine and the aliphatic dicarboxylic acid of the starting materials, the same materials as those exemplified in the explanation of the above-mentioned aliphatic copolymerized polyamide may be mentioned, and the materials as exemplified alicyclic diamine and alicyclic dicarboxylic acid are also contained.

As the aromatic diamine, there may be mentioned meta-xylylenediamine, para-xylylenediamine, etc., and as the aromatic dicarboxylic acid, there may be mentioned naphthalenedicarboxylic acid, terephthalic acid, isophthalic acid, phthalic acid, etc.

These aromatic diamines and aromatic dicarboxylic acids may be used one kind alone or may be used in optional combination of two or more kinds.

Also, the aromatic copolymerized polyamide resin may contain a constitutional unit derived from a lactam and an aminocarboxylic acid, and as the lactam and the aminocarboxylic acid, the same materials as those exemplified as the starting materials of the above-mentioned aliphatic copolyamide resin may be mentioned.

These lactams and aminocarboxylic acids may be used a single kind alone or may be used in combination of two or more kinds.

As the specific examples of the aromatic copolymerized polyamide (A-2), there may be mentioned polyhexamethylene adipamide/polyhexamethylene terephthalamide (polyamide 66/6T), polyhexamethylene terephthalamide/polycaproamide copolymer (polyamide 6T/6), polyhexamethylene adipamide/polyhexamethylene isophthalamide copolymer (polyamide 66/6I), polyhexamethylene isophthalamide/polycaproamide copolymer (polyamide 6I/6), polydodecamide/polyhexamethylene terephthalamide copolymer (polyamide 12/6T), polyhexamethylene adipamide/polyhexamethylene terephthalamide/polyhexamethylene isophthalamide copolymer (polyamide 66/6T/6I), polyhexamethylene adipamide/polycaproamide/polyhexamethylene isophthalamide copolymer (polyamide 66/6/6I), polyhexamethylene terephthalamide/polyhexamethylene isophthalamide copolymer (polyamide 6T/6I), polyhexamethylene terephthalamide/poly(2-methylpentamethylene terephthalamide) copolymer (polyamide 6T/M5T), etc. The aromatic copolymerized polyamide (A-2) may be used a single kind alone or may be used in combination of two or more kinds. Among these, polyamide 6T/6I is preferable.

As the producing device and the polymerization method of the aromatic copolymerized polyamide (A-2), the same as those exemplified in the section of the aliphatic copolymerized polyamide (A-1) may be mentioned.

A degree of polymerization of the aromatic copolymerized polyamide (A-2) in the present invention is not particularly limited, and a relative viscosity thereof is preferably 1.5 to 4.0, and more preferably 1.8 to 3.0, which is measured at a resin temperature of the aromatic copolymerized polyamide (A-2) of 25 °C with a concentration of 1% in 98% sulfuric acid in accordance with HS K 6920.

A terminal amino group concentration of the aromatic copolymerized polyamide (A-2) can be obtained by neutralization titration by dissolving in a mixed solvent of phenol and methanol. The terminal amino group concentration of the aromatic copolymerized polyamide (A-2) is preferably $2.00\times10^{-5}$ eq/g or more and $6.00\times10^{-5}$ eq/g or less.

When the aromatic copolymerized polyamide (A-2) is contained in the polyamide resin (A), a content of the aromatic copolymerized polyamide (A-2) contained in 100% by mass of the polyamide resin (A) is preferably 1 to 30% by mass, and more preferably 3 to 20% by mass from the viewpoints of mechanical property and moldability.

(A-3) Aliphatic Homopolyamide

The aliphatic homopolyamide (A-3) is a polyamide resin comprising one kind of aliphatic constitutional unit. The aliphatic homopolyamide (A-3) may be a material comprising at least one of one kind of a lactam and an aminocarboxylic acid which is a hydrolysate of the lactam, or may be a material comprising a combination of one kind of a diamine and one kind of a dicarboxylic acid. Here, the combination of the diamine and the dicarboxylic acid is deemed to be one kind of a monomer by the combination of one kind of a diamine and one kind of a dicarboxylic acid.

As the lactam, the same as those exemplified as the starting material of the aliphatic copolymerized polyamide (A-1) may be mentioned. Among these, from the viewpoint of polymerization productivity, one kind selected from the group consisting of ε-caprolactam, undecanelactam, dodecanelactam and laurolactam is preferable.

Also, as the aminocarboxylic acid, the same as those exemplified as the starting material of the aliphatic copolymerized polyamide (A-1) may be mentioned. Among these, from the viewpoint of polymerization productivity, one kind selected from the group consisting of 6-aminocaproic acid, 11-aminoundecanoic acid, and 12-amino-dodecanoic acid is preferable.

As the diamine, the same as those exemplified as the starting material of the aliphatic copolymerized polyamide (A-1) may be mentioned. Among these, from the viewpoint of polymerization productivity, aliphatic diamine is preferable, and hexamethylenediamine is more preferable.

As the dicarboxylic acid, the same as those exemplified as the starting material of the aliphatic copolymerized polyamide (A-1) may be mentioned. Among these, aliphatic dicarboxylic acid is preferable, one kind selected from the group consisting of adipic acid, sebacic acid and dodecanedioic acid is more preferable, and sebacic acid or dodecanedioic acid is further preferable.

As the aliphatic homopolyamide (A-3), there may be specifically mentioned polycaprolactam (polyamide 6), polyenantolactam (polyamide 7), polyundecanelactam (polyamide 11), polylaurolactam (polyamide 12), polyhexamethylene adipamide (polyamide 66), polytetramethylene dodecamide (polyamide 412), polypentamethylene azelamide (polyamide 59), polypentamethylene sebacamide (polyamide 510), polypentamethylene dodecamide (polyamide 512), polyhexamethylene azelamide (polyamide 69), polyhexamethylene sebacamide (polyamide 610), polyhexamethylene dodecamide (polyamide 612), polynonamethylene adipamide (polyamide 96), polynonamethylene azelamide (polyamide 99), polynonamethylene sebacamide (polyamide 910), polynonamethylene dodecamide (polyamide 912), polydecamethylene adipamide (polyamide 106), polydecamethylene azelamide (polyamide 109), polydeca-methylene decamide (polyamide 1010), polydecamethylene dodecamide (polyamide 1012), polydodecamethylene adipamide (polyamide 126), polydodecamethylene azelamide (polyamide 129), polydodecamethylene sebacamide (polyamide 1210), polydodecamethylene dodecamide (polyamide 1212), polyamide 122, etc. The aliphatic homopolyamide (A-3) may be used one kind alone or may be used as a mixture in which two or more kinds are combined.

Among these, the aliphatic homopolyamide (A-3) is preferably at least one kind selected from the group consisting of polyamide 6, polyamide 11, polyamide 12, polyamide 66, polyamide 610 and polyamide 612, from the viewpoint of polymerization productivity, more preferably at least one kind selected from polyamide 6, polyamide 11, polyamide 12, polyamide 610 and polyamide 612, and further preferably polyamide 6.

As the producing device and the polymerization method of the aliphatic homopolyamide (A-3), the same as those exemplified in the section of the aliphatic copolymerized polyamide (A-1) may be mentioned.

A relative viscosity of the aliphatic homopolyamide (A-3) is preferably 2.7 or more, and more preferably 2.7 or more and 5.0 or less, which is the relative viscosity measured at 25 °C by dissolving 1 g of the aliphatic homopolyamide in 100 ml of 96% concentrated sulfuric acid in accordance with JIS K 6920. Further, from the viewpoint of improving the effects of the present invention, it is further preferably 2.7 or more and less than 4.5. If it is 2.7 or more, a melt viscosity of the polyamide composition is not too low, so that parison shape retention during blow molding is particularly good, and if it is 5.0 or less, the melt viscosity of the polyamide composition is not so high, and a uniform wall thickness of the molten resin during blow molding can be obtained.

A terminal amino group concentration of the aliphatic homopolyamide (A-3) can be obtained by neutralization titration by dissolving in a mixed solvent of phenol and methanol. The terminal amino group concentration of the aliphatic homopolyamide (A-3) is preferably 30 μmol/g or more, and more preferably 30 μmol/g or more and 50 μmol/g or less.

A content of the aliphatic homopolyamide (A-3) contained in 100% by mass of the polyamide resin (A) is preferably less than 75% by mass, further preferably less than 70% by mass, and particularly preferably less than 60% by mass, from the viewpoints of mechanical property and blow molding property, and when the aliphatic homopolyamide (A-3) is contained in the polyamide resin (A), it is preferably 0.1% by mass or more.

(A-4) Aromatic Homopolyamide

The aromatic homopolyamide (A-4) is an aromatic polyamide resin comprising one kind of a constitutional unit derived from an aromatic-based monomer component and, for example, is a polyamide resin using an aliphatic dicarboxylic acid and an aromatic diamine, an aromatic dicarboxylic acid and an aliphatic diamine, or an aromatic dicarboxylic acid and an aromatic diamine as starting materials, and obtained by polycondensation of these. Here, the combination of the diamine and the dicarboxylic acid is deemed to be one kind of a monomer by the combination of one kind of a diamine and one kind of a dicarboxylic acid.

As the aliphatic diamine and the aliphatic dicarboxylic acid of the starting materials, the same materials as those exemplified in the above-mentioned aliphatic polyamide may be mentioned, and those exemplified as the alicyclic diamine and the alicyclic dicarboxylic acid are also contained.

As the aromatic diamine, there may be mentioned meta-xylylenediamine, para-xylylenediamine, etc., and as the aromatic dicarboxylic acid, there may be mentioned naphthalenedicarboxylic acid, terephthalic acid, isophthalic acid, phthalic acid, etc.

Specific examples of the aromatic homopolyamide (A-4) may be mentioned polynonamethylene terephthalamide (polyamide 9T), polyhexamethylene terephthalamide (polyamide 6T), polyhexamethylene isophthalamide (polyamide 6I), polyxylylene adipamide (polyamide MXD6), etc. The aromatic homopolyamide (A-4) may be used one kind alone or may be used as a mixture in which two or more kinds are combined.

As the producing device and the polymerization method of the aromatic homopolyamide (A-4), the same as those exemplified in the section of the aliphatic copolymerized polyamide (A-1) may be mentioned.

A degree of polymerization of the (A-4) aromatic homopolyamide resin in the present invention is not particularly limited, and a relative viscosity thereof is preferably 1.5 to 4.0, and more preferably 1.8 to 3.0, which is measured at a resin temperature of the (A-4) aromatic homopolymerized polyamide of 25 °C with a concentration of 1% in 98% sulfuric acid in accordance with JIS K 6920.

When the aromatic homopolyamide (A-4) is contained in the polyamide resin (A), a content of the aromatic homopolyamide (A-4) contained in 100% by mass of the polyamide resin (A) is preferably 1 to 30% by mass, and more preferably 3 to 20% by mass from the viewpoints of mechanical property and moldability.

A relative viscosity of the polyamide resin (A) is preferably 2.7 or more, and more preferably 2.7 or more and 5.0 or less, which is the relative viscosity measured at 25 °C by dissolving 1 g of the aliphatic homopolyamide in 100 ml of 96% concentrated sulfuric acid in accordance with JIS K 6920. Further, from the viewpoint of improving the effects of the present invention, it is further preferably 2.7 or more and less than 4.5. If it is 2.7 or more, a melt viscosity of the polyamide composition is not too low, so that retention of the parison shape during blow molding is particularly good. Also, if it is 5.0 or less, the melt viscosity of the polyamide composition is not so high, and a uniform wall thickness of the molten resin during blow molding can be obtained.

When the polyamide resin (A) contains two or more kinds of polyamide resins (for example, at least one kind of an aliphatic homopolyamide (A-3) and at least one kind of an aliphatic copolymerized polyamide (A-1)) having different relative viscosities, the relative viscosity of the polyamide resin (A) is preferably measured by the above-mentioned contents, and when the relative viscosities of the respective polyamide resins and the mixing ratio thereof are known, an average value calculated by summing the values multiplied by each relative viscosity by the mixing ratio may be made the relative viscosity of the polyamide resin (A).

From the reactivity with the impact resistant material (C), a terminal amino group concentration of the polyamide resin (A) is preferably in the range of 30 μmol/g or more, more preferably in the range of 30 μmol/g or more and 110 μmol/g or less, and further preferably in the range of 30 μmol/g or more and 70 μmol/g or less, as a terminal amino group concentration obtained by dissolving it a mixed solvent of phenol and methanol and by neutralization titration. If it is 30 μmol/g or more, it has good reactivity with the impact resistant material (C), and a melt viscosity and impact resistance can be sufficiently obtained. Also, if it is 110 μmol/g or less, the melt viscosity is not too high, and molding processability is good.

When the polyamide resin (A) contains two or more kinds of polyamide resins (for example, at least one kind of an aliphatic homopolyamide (A-3) and at least one kind of an aliphatic copolymerized polyamide (A-1)) having different terminal amino group concentrations, the terminal amino group concentration of the polyamide resin (A) is preferably measured by the above-mentioned neutralization titration, and when the terminal amino group concentrations of the respective polyamide resins and the mixing ratio thereof are known, an average value calculated by summing the values multiplied by each terminal amino group concentration by the mixing ratio may be made the terminal amino group concentration of the polyamide resin (A).

The polyamide resin (A) is contained in an amount of 60 to 85% by mass, preferably contained in an amount of 70 to 85% by mass, more preferably contained in an amount of 73 to 80% by mass in 100% by mass of the polyamide resin composition. If the contained ratio of the polyamide resin (A) is within the above-mentioned range, mechanical property and heat resistance are good, and also low temperature physical property and blow molding property are good.

(B) Olefin-Based Ionomer

The polyamide resin composition contains an olefin-based ionomer (B). The olefin-based ionomer refers to a material in which a copolymer of an olefin and an α,β-unsaturated carboxylic acid and/or an 4-unsaturated carboxylic acid ester is neutralized with a metal or a metal ion. When the olefin-based ionomer (B) is formulated, parison characteristics at the time of blow molding are significantly improved, but the melt viscosity is not so significantly increased, so that the productivity is improved.

As a resin of the olefin-based ionomer (B), there may be mentioned an (ethylene and/or propylene)/α,β-unsaturated carboxylic acid and/or α,β-unsaturated carboxylic acid ester)-based copolymer. These may be used one kind alone or may be used two or more kinds in admixture. The (ethylene and/or propylene)/(α,β-unsaturated carboxylic acid and/or α,β-unsaturated carboxylic acid ester)-based copolymer is a polymer in which ethylene and/or propylene and an 4-unsaturated carboxylic acid and/or an α,β-unsaturated carboxylic acid ester monomer are copolymerized. As the α,β-unsaturated carboxylic acid monomer, there may be mentioned acrylic acid and methacrylic acid. As the α,β-unsaturated carboxylic acid ester monomer, there may be mentioned a methyl ester, ethyl ester, propyl ester, butyl ester, pentyl ester, hexyl ester, heptyl ester, octyl ester, nonyl ester, decyl ester, etc., of these α,β-unsaturated carboxylic acids. These may be used one kind alone or two or more kinds in combination. As the metal and the metal ion used for the ionomer, there may be mentioned Na, K, Cu, Mg, Ca, Ba, Zn, Cd, Al, Fe, Co and Ni, and ions thereof, etc. These may be used one kind alone or two or more kinds in combination, and it is preferable to contain at least Zn (in the present specification, it is also referred to as "zinc"). Among these, an ionomer of an ethylene-methacrylic acid copolymer is preferable. As the commercially available product of the olefin-based ionomer, there may be mentioned Himilan (Registered Trademark) series available from Dow-Mitsui Polychemicals Co., Ltd.

The melting point of the olefin-based ionomer (B) is preferably 75 to 100 °C, and more preferably 80 to 95 °C, which is the value measured by raising the temperature at 20 °C/min under a nitrogen atmosphere in accordance with ISO11357-3 by a differential scanning calorimeter (DSC).

In addition, the olefin-based ionomer (B) preferably has a density measured in accordance with JIS K 7112 of 940 to 980 $kg/m^3$, and more preferably 950 to 970 $kg/m^3$.

Further, in the metal ion contained in the olefin-based ionomer (B), it is preferable to contain at least zinc, and a formulation amount of the zinc element by the high frequency inductively coupled plasma emission spectroscopic analysis ICP-AES measurement is more preferably 3% or more.

When the melting point, density and zinc amount are within the above-mentioned ranges, it is preferable from the viewpoints of compatibility with the polyamide and wall thickness stability by suppressing swell expansion during blow molding.

MFR of the olefin-based ionomer (B) measured at 190 °C and a load of 2.16 kg in accordance with JIS K7210 (1999) is preferably 2 g/10 min or less, and more preferably 1 g/10 min or less. If the MFR of the olefin-based ionomer (B) is within the above-mentioned range, it is preferable from the points of drawdown property and dimensional stability.

The (B) olefin-based ionomer is contained in an amount of 5 to 20% by mass, preferably contained in an amount of 8 to 17% by mass, more preferably contained in an amount of 10 to 15% by mass in 100% by mass of the polyamide resin composition. If the contained ratio of the olefin-based ionomer (B) is within the above-mentioned range, low temperature characteristics and parison characteristics in blow molding become good.

(C) Impact Resistant Material

The polyamide resin composition contains an impact resistant material (C). As the impact resistant material, a rubber-state polymer may be mentioned. The impact resistant material preferably has a flexural modulus measured in accordance with ASTM D-790 of 500 MPa or less. Incidentally, in the impact resistant material (C), the olefin-based ionomer (B) is not included.

As the impact resistant material (C), there may be specifically mentioned an (ethylene and/or propylene)/α-olefin-based copolymer, an (ethylene and/or propylene)/(α,β-unsaturated carboxylic acid and/or α,β-unsaturated carboxylic acid ester)-based copolymer, etc. These may be used one kind alone or two or more kinds in combination. As the impact resistant material (C), an ethylene/α-olefin-based copolymer is preferably mentioned.

The (ethylene and/or propylene)/α-olefin-based copolymer is a polymer in which ethylene and/or propylene and an α-olefin having 3 or more or 4 or more carbon atoms are copolymerized.

As the α-olefin having 3 or more carbon atoms, there may be mentioned propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosen, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc. These may be used one kind alone or two or more kinds in combination.

Also, the copolymer may be a material in which a polyene such as an unconjugated diene, etc., is copolymerized. As the unconjugated diene, there may be mentioned 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbomene, 5-ethylidene-2-norbornene, 5-methylene-2-norbornene, 5-isopropylidene-2-norbornene, 6-chroromethyl-5-isopropenyl-2-norbornene, 2,3-diisopropylidene-5-norbornene, 2-ethylidene-3-isopropylidene-5-norbornene, 2-propenyl-2,5-norbornadiene, etc. These may be used one kind alone or two or more kinds in combination.

The (ethylene and/or propylene)/(α,β-unsaturated carboxylic acid and/or α,β-unsaturated carboxylic acid ester)-based copolymer is a polymer in which ethylene and/or propylene and an α,β-unsaturated carboxylic acid and/or an α,β-unsaturated carboxylic acid ester monomer are copolymerized. As the α,β-unsaturated carboxylic acid monomer, there may be mentioned acrylic acid and methacrylic acid. As the α,β-unsaturated carboxylic acid ester monomer, there may be mentioned a methyl ester, ethyl ester, propyl ester, butyl ester, pentyl ester, hexyl ester, heptyl ester, octyl ester, nonyl ester, decyl ester, etc., of these α,β-unsaturated carboxylic acids. These may be used one kind alone or two or more kinds in combination.

Also, the impact resistant material (C) preferably contains a functional group having an affinity for the polyamide resin (A) in its molecule. The (ethylene and/or propylene)/α-olefin-based copolymer can contain a functional group having an affinity for the polyamide resin (A) in its molecule by modifying it with a carboxylic acid and/or a derivative thereof, and/or an unsaturated carboxylic acid and/or a derivative thereof. The (ethylene and/or propylene)/(α,β-unsaturated carboxylic acid and/or α,β-unsaturated carboxylic acid ester)-based copolymer has a carboxyl group and/or a carboxylic acid ester group, so that a functional group having an affinity for the polyamide resin (A) in its molecule, and it may be further modified by a carboxylic acid and/or a derivative thereof, and/or an unsaturated carboxylic acid and/or a derivative thereof.

As the functional group having an affinity for the polyamide resin (A), there may be mentioned a carboxy group, an acid anhydride group, a carboxylic acid ester group, a carboxylic acid metal salt, a carboxylic acid imide group, a carboxylic acid amide group, an epoxy group, etc.

As an example of the compound containing these functional groups, there may be mentioned acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid and a metal salt of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-[2.2.1]-5-heptene-2,3-dicarboxylic acid anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate, glycidyl citraconate, etc. These may be used one kind alone or two or more kinds in combination. Among these, maleic anhydride is preferable.

As a method for introducing these functional groups into a resin, there may be mentioned (i) a method of copolymerizing a copolymerizable monomer having a functional group at the time of polymerization of the resin, (ii) a method of introducing a functional group into a molecular chain or molecular terminal of the resin by a polymerization initiator, a chain transfer agent, etc., (iii) a method of grafting a compound (graft compound) having a functional group and a functional group capable of grafting onto the resin, etc. These introducing method may be used alone or in optional combination.

Among these, the (ethylene and/or propylene)/α-olefin-based copolymer used as the impact resistant material (C) is preferably a polymer acid-modified by an unsaturated carboxylic acid or its acid anhydride, etc., and the (ethylene and/or propylene)/(α,β-unsaturated carboxylic acid and/or α,β-unsaturated carboxylic acid ester)-based copolymer is preferably a polymer which is, in addition to the functional group provisionally possessed, further acid-modified by an unsaturated carboxylic acid or its acid anhydride, etc.

When the acid anhydride group is contained in the impact resistant material (C), a content of the acid anhydride group in the impact resistant material (C) is preferably exceeding 25 μmol/g and less than 100 μmol/g, more preferably 35 μmol/g or more and less than 95 μmol/g, and further preferably 40 μmol/g or more and 90 μmol/g or less. If the content exceeds 25 μmol/g, a composition having a high melt viscosity can be obtained, and an objective wall thickness dimension can be obtained in blow molding. Also, if the content is less than 100 μmol/g, the melt viscosity is not so high, and a load on the extruder can be suppressed so that molding processing can be carried out well. The content of the acid anhydride group possessed by the impact resistant material (C) can be measured using a sample solution prepared by using toluene and ethanol, by neutralization titration with a 0.1N KOH ethanol solution using phenolphthalein as an indicator.

As the impact resistant material (C), when two or more kinds of the impact resistant materials having different contents of an acid anhydride group are used, the content of the acid anhydride group in the impact resistant material (C) is preferably measured by neutralization titration using a sample solution prepared by using toluene and ethanol, with a 0.1N KOH ethanol solution using phenolphthalein as an indicator, and when the content of the acid anhydride group of each impact resistant material and a mixing ratio are known, an average value calculated by summing the values multiplied by each content of the acid anhydride group by the mixing ratio may be made the acid anhydride amount of the impact resistant material (C).

MFR of the impact resistant material (C) measured at a temperature of 190 °C and a load of 2.16 kg in accordance with ASTM D1238 is preferably 2 g/10 min or less, and when it is within the above-mentioned range, the shape of the parison to become unstable at blow molding is suppressed, and the thickness of the molded product tends to be more uniform. In addition, drawdown of the parison does not become too large, and good blow molding property tends to be obtained.

The (C) impact resistant material is contained in an amount of 5 to 20% by mass, preferably contained in an amount of 5 to 15% by mass in 100% by mass of the polyamide resin composition. If the contained ratio of the impact resistant material (C) is within the above-mentioned range, burning suppression, low temperature physical property and uniformity of the wall thickness of the blow molded product are good.

In the polyamide resin composition, by containing both of the olefin-based ionomer (B) and the impact resistant material (C), both of suppression of burning and blister resistance are achieved in combination, and it is excellent in dimensional stability.

(D) Heat Resistant Agent

It is preferable that the polyamide resin composition contains a heat resistant agent (D). As the heat resistant agent, one that can improve heat resistance of a polyamide resin can be used, and an organic or inorganic heat resistant agent can be used depending on the purpose.

The polyamide resin composition more preferably contains at least one kind of an organic antioxidant as a heat resistant agent from the viewpoints of heat welding characteristics and heat resistant characteristics. By containing the organic antioxidant, even when an interval time is long during blow molding, heat welding property can be more improved while maintaining usual heat aging property, physical property, melt viscosity, etc. This is because, for example, it can be considered that by the addition of an organic antioxidant, gelation of an impact resistant agent due to thermal deterioration is suppressed, whereby nucleating action is suppressed.

(Organic Heat Resistant Agent)

As the organic antioxidant, there may be mentioned a phenol-based antioxidant, a phosphorus-based antioxidant, a sulfur-based antioxidant, etc.

As the phenol-based antioxidant, a hindered phenol-based antioxidant can be preferably mentioned. In the present specification, the hindered phenol refers to a compound having a substituent at the ortho position (hereinafter also referred to as "o-position") of the hydroxyl group of phenol. As the substituent at the o-position, it is not particularly limited, and there may be mentioned an alkyl group, an alkoxy group, an amino group, a halogen, etc. Among these, an alkyl group such as a methyl group, an ethyl group, an n-propyl group, an i-propyl group, an n-butyl group, a sec-butyl group, an i-butyl group, a t-butyl group, etc., is preferable, a bulky i-propyl group, a sec-butyl group, an i-butyl group and a t-butyl group are more preferable, and a t-butyl group is most preferable. In addition, as the o-position, it is preferable that both of the two o-positions to the hydroxyl group of phenol have a substituent.

The hindered phenol having a t-butyl group at the o-position is specifically mentioned N,N'-hexamethylenebis(3,5-di-t-butyl-4-hydroxy-hydrocinnamamide, pentaerythritol-tetrakis[3-(3,5-di-t-butyl-4-hydroxyphenyl)-propionate], ethylenebis-(oxyethylene) bis[3-(5-t-butyl-4-hydroxy-m-tolyl)propionate] and 3,9-bis[2-[3-(3-t-butyl-4-hydroxy-5-methylphenyl)propionyloxy]-1,1-dimethylethyl]-2,4,8,10-tetraoxa-spiro[5.5]undecane. These may be used one kind alone or may be used in combination of two or more kinds. As commercially available products of these heat resistant agents, there may be mentioned "Irganox (Registered Trademark) 1010" (BASF) and "Sumilizer (Registered Trademark) GA-80" (Sumitomo Chemical Co., Ltd.).

As the phosphorus-based antioxidant, a phosphorous acid ester compound of a hindered phenol and a hypophosphorous acid ester compound of a hindered phenol are preferable, a phosphorous acid ester compound of a hindered phenol having a t-butyl group(s) at the o-position(s) and a hypophosphorous acid ester compound of a hindered phenol having a t-butyl group(s) at the o-position(s) are more preferable, and a phosphorous acid ester compound of a hindered phenol having a t-butyl group(s) at the o-position(s) is further preferable. The phosphorous acid ester compound of a hindered phenol having a t-butyl group(s) at the o-position(s) is specifically mentioned tris(2,4-di-t-butylphenyl)phosphite and bis(2,6-di-t-butyl-4-methylphenyl)penta-erythritol diphosphite. The hypophosphorous acid ester compound of a hindered phenol having a t-butyl group(s) at the o-position(s) is specifically mentioned biphenyl comprising p,p,p',p'-tetrakis(2,4-di-t-butylphenoxy)-4,4'-biphenyldiphosphine as a main component, and a reaction product of phosphorus trichloride and 2,4-di-t-butylphenol. As the commercially available product of these heat resistant agents may be mentioned "Irgafos (Registered Trademark) 168" (BASF) and "Hostanox (Registered Trademark) P-EPQ (Registered Trademark)" (Clariant Chemicals Co., Ltd.). These may be used one kind alone or may be used in combination of two or more kinds.

As the sulfur-based antioxidant, there may be mentioned distearyl-3,3-thiodipropionate, pentaerythrityltetrakis(3-laurylthiopropionate) and didodecyl(3,3'-thiodipropionate). These may be used one kind alone or may be used in combination of two or more kinds.

These organic antioxidants may be used one kind alone or in combination of two or more kinds.

(Inorganic Heat Resistant Agent)

As a kind of the inorganic heat resistant agent of the heat resistant agent, there are copper compounds and a potassium halide, and as the copper compounds, there may be mentioned cuprous iodide, cuprous bromide, cupric bromide, copper acetate, etc. From the viewpoints of heat resistance and suppression of metal corrosion, cuprous iodide is preferable. As the potassium halide, there may be mentioned potassium iodide, potassium bromide, potassium chloride, etc. From the viewpoints of heat resistance and suppression of metal corrosion, potassium iodide and/or potassium bromide is/are preferable. These may be used one kind alone or may be used in combination of two or more kinds.

Further, it is more effective that a nitrogen-containing compound such as melamine, benzoguanamine, dimethylolurea or cyanuric acid, etc., is used in combination.

The polyamide resin composition preferably contains at least one kind of phenol-based antioxidant from the viewpoint of heat welding property, more preferably contains at least one kind of a phenol-based antioxidant and at least one kind of a phosphorus-based antioxidant, further preferably contains a hindered phenol having a t-butyl group(s) at the o-position(s), and a phosphorous acid ester compound of a hindered phenol having a t-butyl group(s) at the o-position(s) or a hypophosphorous acid ester compound of a hindered phenol having a t-butyl group(s) at the o-position(s), and particularly preferably contains a hindered phenol having a t-butyl group(s) at the o-position(s) and a phosphorous acid ester compound of a hindered phenol having a t-butyl group(s) at the o-position(s).

The (D) heat resistant agent is contained in an amount of preferably 0.1 to 3% by mass, and more preferably 0.5 to 2% by mass in 100% by mass of the polyamide resin composition. If the contained ratio of the (D) heat resistant agent is within the above-mentioned range, burning of the appearance of the molded product, unevenness of the wall thickness of the inner surface and yellowing of the entire molded product can be suppressed, and the appearance can be made good.

(E) Additives

The polyamide resin composition may optionally contain, as an optional component depending on the purposes, etc., a functionality imparting agent such as a dye, a pigment, a fibrous reinforcement, a particular reinforcement, a plasticizer, an antioxidant (excluding the component (D)), a foaming agent, a weather resistant agent, a crystal nucleating agent, a crystallization accelerator, a mold release agent, a lubricant, an antistatic agent, a flame retardant, a flame retardant aid, a colorant, etc. In order to improve the effect of the present invention, the polyamide resin composition preferably contains an antioxidant.

An optional (E) additive is preferably contained in an amount of 0.01 to 1% by mass, and more preferably 0.05 to 0.5% by mass in 100% by mass of the polyamide resin composition.

The polyamide resin composition may contain a resin other than the polyamide resin (A), the olefin-based ionomer (B) and the impact resistant material (C). The resin other than the polyamide resin (A), the olefin-based ionomer (B) and the impact resistant material (C) is preferably 2% by mass or less, more preferably less than 0.1% by mass, and further preferably not contained in 100% by mass of the polyamide resin composition from the viewpoint of suppression of burning.

[Method for Producing Polyamide Resin Composition]

A method for producing a polyamide resin composition is not particularly limited, and, for example, the following method can be applied.

For mixing the polyamide resin (A), the olefin-based ionomer (B), the impact resistant material (C), an optional (D) heat resistant agent and other optional component(s), generally known melt-kneading machines such as a single-screw or twin-screw extruder, a Banbury mixer, a kneader and a mixing roll are used. For example, any method may be used such as a method in which using a twin-screw extruder, all the starting materials are formulated and then melt-kneading, a method in which a part of the starting materials is formulated and then melt-kneading, and further the remaining starting materials are formulated and then melt-kneading, or a method in which a part of the starting materials is formulated and then the remaining starting materials are mixed therewith using a side feeder during melt-kneading, etc.

[Use of Polyamide Resin Composition]

Although the polyamide resin composition has a low melt viscosity, it has a parison holding ability and is excellent in the surface appearance of the molded product even if it is stagnated during molding, so that it can be suitably used for production of the blow molded product by blow molding. Further, it can be suitably used for production of an extrusion molded product by extrusion molding, an injection molded product by injection molding, and a rotary molded product by rotary molding.

As a method for producing a blow molded product from the polyamide resin composition by blow molding, it is not particularly limited, and a known method can be utilized. In general, after forming a parison using a usual blow molding machine, blow molding may be carried out. As a preferable resin temperature at the time of forming the parison, it is preferably carried out in the temperature range of 10 °C to 70 °C higher than the melting point of the polyamide resin composition.

The blow molded product obtained from the polyamide resin composition by blow molding is suppressed in deviation of the thickness and excellent in dimensional stability.

The blow molded product comprising the polyamide resin composition preferably has, as shown in FIG. 1, a standard deviation of the respective thicknesses of the five portions, the shoulder portion 1, the R portion 2, the body portion 3, the welded portion vicinity 4 and the welded portion 5 is 1.00 or less, more preferably 0.90 or less, and further preferably 0.80 or less.

In particular, in the blow molded product obtained from the polyamide resin composition by blow molding, it can be suppressed to become the wall thickness of the welded portion to be thin.

In the blow molded product comprising the polyamide resin composition, a value (thickness of the welded portion/average thickness) in which the thickness of the welded portion 5 is divided by the average thickness of the five portions of the shoulder portion 1, the R portion 2, the body portion 3, the welded portion vicinity 4 and the welded portion 5 is preferably 0.50 or more, more preferably 0.55 or more, and further preferably 0.60 or more.

As a method for producing an extruded molded product from the polyamide resin composition by extrusion molding, it is not particularly limited, and a known method can be utilized.

It is also possible to obtain a multilayer structure by subjecting to co-extrusion with a polyolefin such as polyethylene, etc., or other thermoplastic resins, and then, subjecting to blow molding. In such a case, it is also possible to provide an adhesive layer between the polyamide resin composition layer and the other thermoplastic resin layer such as polyolefin, etc. In the case of a multilayer structure, the polyamide resin composition of the present invention can be used for both the outer layer and the inner layer.

As a method for producing an injection molded product from the polyamide resin composition by injection molding, it is not particularly limited, and a known method can be utilized. For example, a method in accordance with ISO294-1 can be referred to.

As a method for producing a rotary molded product from the polyamide resin composition by rotary molding, it is not particularly limited, and a known method can be utilized. For example, it can refer to the method described in WO 2019/054109.

The blow molded product by blow molding, the extrusion molded product by extrusion molding, the injection molded product by injection molding and the rotary molded product by rotary molding are not particularly limited, and there may be suitably mentioned automobile parts such as spoilers, air intake ducts, intake manifolds, resonators, fuel tanks, gas tanks, hydraulic oil tanks, fuel filler tubes, fuel delivery pipes, other various kinds of hoses, tubes, tanks, etc., electric tool housings, pipes, etc., and also various uses such as electric and electronic parts, household and office supplies, building related parts, furniture parts, etc. Among these, the molded product of the polyamide resin composition of the present invention is excellent in blow molding property that can correspond to large-sized molded products and also excellent in impact resistance, so that it can be suitably applied to large-sized tanks, in particular, to high-pressure gas tanks.

In addition, the polyamide resin composition is excellent in gas barrier property, so that it can be suitably used for molded products that come into contact with high-pressure gas, for example, tanks, tubes, hoses, films, etc., that come into contact with high-pressure gas. As a kind of the above-mentioned gas, it is not particularly limited, and there may be mentioned hydrogen, nitrogen, oxygen, helium, methane, butane, propane, etc., gases having a small polarity are preferable, and hydrogen, nitrogen and methane are particularly preferable.

EXAMPLES

Hereinafter, the present invention will be described in more detail with reference to Examples and Comparative Examples, but the present invention is not limited to these Examples. Incidentally, the evaluation methods of physical properties of the resins and the molded products used in Examples and Comparative Examples are shown below.

(Blow Molding Property)

The blow molding property was evaluated by (1) to (5).

The blow molding property was confirmed using a blow molding machine Type DA-50 attached with an accumulator head manufactured by PLACO Co., Ltd. The measurement conditions were a cylinder temperature of 240 °C, a screw rotation speed of 40 rpm, a die diameter of 50 mm, a cylindrical 3-liter bottle mold, and a mold temperature of 60 °C to obtain a molded product. The obtained molded product was used for the evaluations of (2) to (5). Also, the evaluation of (1) was carried out under this condition.

(1) Drawdown Property

A parison was injected for 1 m at a constant thickness, and the amount of sagging after 2 seconds was measured to evaluate the drawdown property. When the amount of sagging is smaller, it is excellent in drawdown property. Specifically, when the amount of sagging is 15 cm or less, it is excellent in drawdown property.

(2) Inner Surface Burning

The inner surface burning of the blow molded product was judged by the following criteria by the judgment of naked eyes. In the following criteria, the material of 2 or 3 is judged to be passed.

3: Almost no burning is seen on the entire molded product, and there is a gloss on the surface.
2: Whereas burning is seen on the thick portion, but there is a gloss on the surface.
1: Burning is seen on the molded product, and there is no gloss on the surface.

(3) Unevenness of Inner Surface

In order to confirm uniformity of the wall thickness, unevenness of the inner surface was judged by naked eyes, and evaluated by the following criteria. When the unevenness is more suppressed, then the uniformity of the wall thickness is good.

○: The surface condition is equivalent to that of the outer surface, and it is uniform without large unevenness.
x: Different from the outer surface, large unevenness is confirmed.

(4) Outer Surface Mold Transferability

The transferability of the mold of the outer surface of the blow molded product was judged by the following criteria by the judgment of naked eyes.

○: The transferability of the mold is good.
x: The transferability of the mold is poor.

(5) Dimensional Stability

As shown in FIG. 1, the wall thicknesses of the blow molded product were measured at the five portions of the shoulder portion 1, the R portion 2, the body portion 3, the welded portion vicinity 4 and the welded portion 5, respectively, by a caliper, and their standard deviations were calculated. When the standard deviation is 1.00 or less, there is little difference in wall thickness between the portions of the molded product, and the dimensional stability is good.

Also, based on the measured values, values in which the thickness of the welded portion 5 is divided by the average thickness of the five portions of the shoulder portion 1, the R portion 2, the body portion 3, the welded portion vicinity 4 and the welded portion 5 (wall thickness of the welded portion/average thickness) were obtained. If this value is small, the welded portion is to be thinner than the whole. Accordingly, if the value is 0.50 or more, it is suppressed that only the welded portion is to be remarkably thin.

(6) Low Temperature Toughness

In accordance with ISO294-1, a test piece was prepared using an injection molding machine SE100D-C160S manufactured by Sumitomo Heavy Industries, Ltd. Using the obtained test piece, it was used for obtaining data of mechanical property.

(6-1) Tensile Break Induced Strain at −60 °C

In accordance with ISO527-2/1A/50, it was measured at −60 °C using an Instron tensile tester model 5567. When the value of the tensile break induced strain at −60 °C is 20% or more, low temperature toughness is good.

(6-2) Charpy Impact Strength at −40 °C

In accordance with ISO179-1/1eA, an edgewise impact test was carried out using a Charpy impact tester No. 258-PC manufactured by Yasuda Seiki Seisakusho, Ltd., at −40 °C and using a test piece having an A notch and a thickness of 4 mm. Charpy impact strength at (n=10) −40 °C is 20 kJ/$m^2$ or more, low temperature toughness is good.

(7) Blister Resistance

In accordance with ISO294-1, a test piece was prepared using an injection molding machine SE100D-C160S manufactured by Sumitomo Heavy Industries, Ltd. Using the obtained test piece, it was used for obtaining data of mechanical property.

High pressure hydrogen gas at 85 °C was sealed in an autoclave from 2 MPa to 87.5 MPa over 30 minutes, a test piece was charged therein, and after holding for 10 minutes, the pressure was reduced to 2 MPa at a decompression rate of 0.5 minute, and after repeating this cycle four times, taken out of the test piece was carried out. The presence or absence of water swelling-like appearance abnormality of the test piece was judged with naked eyes.

○: No water swelling (blister) on the surface of the test piece
x: Water swelling (blister) occurred on the surface of the test piece (8) Comprehensive Evaluation The physical property evaluations of the above-mentioned (1) to (7) were comprehensively evaluated according to the following criteria.

○: It satisfies all the following: for drawdown property, the amount of sagging after 2 seconds is 15 cm or less, for inner surface burning, evaluation according to the above-mentioned criteria is 2 or 3, for unevenness of inner surface, evaluation according to the above-mentioned criteria is ○, for outer surface mold transferability, evaluation according to the above-mentioned criteria is ○, for dimensional stability, standard deviation is 1.00 or less and thickness of welded portion/average thickness is 0.5 or more, value of a tensile break induced strain at −60 °C is 20% or more, Charpy impact strength at −40 °C is 20 kJ/$m^2$ or more, and for blister resistance, evaluation according to the above-mentioned criteria is ○.

x: It does not satisfy one or more of the following: for drawdown property, the amount of sagging after 2 seconds is 15 cm or less, for inner surface burning, evaluation according to the above-mentioned criteria is 2 or 3, for unevenness of inner surface, evaluation according to the above-mentioned criteria is ○, for outer surface mold transferability, evaluation according to the above-mentioned criteria is ○, for dimensional stability, standard deviation is 1.00 or less and thickness of welded portion/average thickness is 0.5 or more, value of a tensile break induced strain at −60 °C is 20% or more, Charpy impact strength at −40 °C is 20 kJ/$m^2$ or more, and for blister resistance, evaluation according to the above-mentioned criteria is ○.

Examples 1 to 9 and Comparative Examples 1 to 5

Each component shown in Table 1 was melt-kneaded by a twin-screw kneader TEX44HCT, a cylinder diameter of 44 mmL/D35, a cylinder temperature of 250 °C, a screw rotation of 160 rpm and a discharge rate of 50 kg/hrs to prepare pellets of the objective polyamide resin composition.

Incidentally, the unit of the composition in the table is % by mass, and the entire resin composition is made 100% by mass.

The obtained pellets were used for the molded product and test piece used for the above-mentioned physical property evaluation. The obtained results are shown in Table 1.

TABLE 1

| Item | | | | Unit | spec | Example 1 | Example 2 | Example 3 |
|---|---|---|---|---|---|---|---|---|
| Composition | Polyamide resin | PA6 | | % by mass | | | | |
| | | PA6/66 | (1) | | | 79.00 | | 73.75 |
| | | PA6/66 | (2) | | | | | |
| | | PA6/66/12 | | | | | 79.00 | |
| | Olefin-based ionomer | Zn-EM Ionomer | | | | 10.00 | 10.00 | 15.00 |
| | Impact resistant material | MAH-EBR | | | | 10.00 | 10.00 | 10.00 |
| | Heat resistant agent | Phenol-based 1 | | | | 0.50 | 0.50 | 0.50 |
| | | Phenol-based 2 | | | | 0.25 | 0.25 | 0.25 |
| | | Phosphorus-based 1 | | | | | | 0.50 |
| | | Phosphorus-based 2 | | | | 0.25 | 0.25 | |
| Molding | Blow molding | Molded product appearance | Inner surface burning | | 2≤ | 3 | 3 | 2 |
| | | | Inner surface unevenness | | | ○ | ○ | ○ |
| | | | Outer surface mold transferability | | | ○ | ○ | ○ |
| | | Drawdown property | Amount of sagging after 2 seconds | cm | 15≥ | 10 | 5 | 5 |
| | | Dimensional stability | Standard deviation | | 1.00≥ | 0.65 | 0.55 | 0.75 |
| | | | Thickness of welded portion /average thickness | | 0.50≤ | 1.03 | 0.97 | 0.68 |
| Low-temperature toughness | Charpy impact strength | | −40° C. | kJ/$m^2$ | 20≤ | 36 | 34 | 47 |
| | Tensile break induced strain | | −60° C. | % | 20≤ | 23 | 21 | 24 |
| Blister | Blister resistance | | | | | ○ | ○ | ○ |
| Comprehensive evaluation | | | | | | ○ | ○ | ○ |

| Item | | | | Unit | spec | Example 4 | Example 5 | Example 6 |
|---|---|---|---|---|---|---|---|---|
| Composition | Polyamide resin | PA6 | | % by mass | | | | |
| | | PA6/66 | (1) | | | | | |
| | | PA6/66 | (2) | | | 73.75 | | 78.75 |
| | | PA6/66/12 | | | | | 73.75 | |
| | Olefin-based ionomer | Zn-EM Ionomer | | | | 15.00 | 15.00 | 10.00 |
| | Impact resistant material | MAH-EBR | | | | 10.00 | 10.00 | 10.00 |
| | Heat resistant agent | Phenol-based 1 | | | | 0.50 | 0.50 | 0.50 |
| | | Phenol-based 2 | | | | 0.25 | 0.25 | 0.50 |
| | | Phosphorus-based 1 | | | | 0.50 | 0.50 | 0.25 |
| | | Phosphorus-based 2 | | | | | | |

TABLE 1-continued

| | | | | | | | | |
|---|---|---|---|---|---|---|---|---|
| Molding | Blow molding | Molded product appearance | Inner surface burning | | 2≤ | 2 | 2 | 3 |
| | | | Inner surface unevenness | | | ○ | ○ | ○ |
| | | | Outer surface mold transferability | | | ○ | ○ | ○ |
| | | Drawdown property | Amount of sagging after 2 seconds | cm | 15≥ | 5 | 0 | 10 |
| | | Dimensional stability | Standard deviation | | 1.00≥ | 0.79 | 0.75 | 0.65 |
| | | | Thickness of welded portion /average thickness | | 0.50≤ | 0.74 | 0.72 | 0.83 |
| Low-temperature toughness | Charpy impact strength | | −40° C. | kJ/m$^2$ | 20≤ | 45 | 40 | 36 |
| | Tensile break induced strain | | −60° C. | % | 20≤ | 24 | 22 | 35 |
| Blister | | | Blister resistance | | | ○ | ○ | ○ |
| | | Comprehensive evaluation | | | | ○ | ○ | ○ |

| | Item | | | Unit | spec | Example 7 | Example 8 | Example 9 |
|---|---|---|---|---|---|---|---|---|
| Composition | Polyamide resin | | PA6 | % by mass | | | | 59.00 |
| | | PA6/66 | (1) | | | | | 20.00 |
| | | PA6/66 | (2) | | | 78.75 | 78.75 | |
| | | | PA6/66/12 | | | | | |
| | Olefin-based ionomer | | Zn-EM Ionomer | | | 12.50 | 15.00 | 10.00 |
| | Impact resistant material | | MAH-EBR | | | 7.50 | 5.00 | 10.00 |
| | Heat resistant agent | | Phenol-based 1 | | | 0.50 | 0.50 | 0.50 |
| | | | Phenol-based 2 | | | 0.50 | 0.50 | 0.25 |
| | | | Phosphorus-based 1 | | | 0.25 | 0.25 | |
| | | | Phosphorus-based 2 | | | | | 0.25 |
| Molding | Blow molding | Molded product appearance | Inner surface burning | | 2≤ | 3 | 3 | 3 |
| | | | Inner surface unevenness | | | ○ | ○ | ○ |
| | | | Outer surface mold transferability | | | ○ | ○ | ○ |
| | | Drawdown property | Amount of sagging after 2 seconds | cm | 15≥ | 10 | 5 | 10 |
| | | Dimensional stability | Standard deviation | | 1.00≥ | 0.55 | 0.64 | 0.64 |
| | | | Thickness of welded portion /average thickness | | 0.50≤ | 0.97 | 0.88 | 0.81 |
| Low-temperature toughness | Charpy impact strength | | −40° C. | kJ/m$^2$ | 20≤ | 34 | 33 | 35 |
| | Tensile break induced strain | | −60° C. | % | 20≤ | 30 | 23 | 23 |
| Blister | | | Blister resistance | | | ○ | ○ | ○ |
| | | Comprehensive evaluation | | | | ○ | ○ | ○ |

| Item | | | Unit | | spec | Comparative Example 1 | Comparative Example 2 | Comparative Example 3 |
|---|---|---|---|---|---|---|---|---|
| Composition | Polyamide resin | | PA6 | % by mass | | 73.75 | | |
| | | PA6/66 | (1) | | | | | |
| | | PA6/66 | (2) | | | | 73.75 | 73.75 |
| | | | PA6/66/12 | | | | | |
| | Olefin-based ionomer | | Zn-EM Ionomer | | | 15.00 | 25.00 | |
| | Impact resistant material | | MAH-EBR | | | 10.00 | | 25.00 |
| | Heat resistant agent | | Phenol-based 1 | | | 0.50 | 0.50 | 0.50 |
| | | | Phenol-based 2 | | | 0.25 | 0.25 | 0.25 |
| | | | Phosphorus-based 1 | | | 0.50 | 0.50 | 0.50 |
| | | | Phosphorus-based 2 | | | | | |
| Molding | Blow molding | Molded product appearance | Inner surface burning | | 2≤ | 2 | 3 | 1 |
| | | | Inner surface unevenness | | | ○ | ○ | ○ |
| | | | Outer surface mold transferability | | | x | ○ | ○ |
| | | Drawdown property | Amount of sagging after 2 seconds | cm | 15≥ | 0 | 0 | 0 |
| | | Dimensional stability | Standard deviation | | 1.00≥ | 1.01 | 1.10 | 1.03 |
| | | | Thickness of welded portion/average thickness | | 0.50≤ | 0.41 | 0.40 | 0.60 |
| Low-temperature toughness | Charpy impact strength | | −40° C. | kJ/m$^2$ | 20≤ | 55 | 36 | 72 |
| | Tensile break induced strain | | −60° C. | % | 20≤ | 24 | 24 | 23 |
| Blister | | | Blister resistance | | | ○ | x | ○ |
| | | Comprehensive evaluation | | | | x | x | x |

TABLE 1-continued

| Item | | | Unit | | spec | Comparative Example 4 | Comparative Example 5 |
|---|---|---|---|---|---|---|---|
| Composition | Polyamide resin | PA6 | | % by mass | | 78.75 | |
| | | PA6/66 (1) | | | | | 100 |
| | | PA6/66 (2) | | | | | |
| | | PA6/66/12 | | | | | |
| | Olefin-based ionomer | Zn-EM Ionomer | | | | 12.50 | |
| | Impact resistant material | MAH-EBR | | | | 7.50 | |
| | Heat resistant agent | Phenol-based 1 | | | | 0.50 | |
| | | Phenol-based 2 | | | | 0.50 | |
| | | Phosphorus-based 1 | | | | 0.25 | |
| | | Phosphorus-based 2 | | | | | |
| Molding | Blow molding | Molded product appearance | Inner surface burning | | 2≤ | 2 | Molding impossible |
| | | | Inner surface unevenness | | | ○ | |
| | | | Outer surface mold transferability | | | ○ | |
| | | Drawdown property | Amount of sagging after 2 seconds | cm | 15≥ | 0 | >100 |
| | | Dimensional stability | Standard deviation | | 1.00≥ | 1.20 | Molding impossible |
| | | | Thickness of welded portion/average thickness | | 0.50≤ | 0.44 | Molding impossible |
| Low-temperature toughness | Charpy impact strength | | −40° C. | kJ/m² | 20≤ | 31 | 8 |
| | Tensile break induced strain | | −60° C. | % | 20≤ | 34 | 15 |
| Blister | | Blister resistance | | | | ○ | ○ |
| | | Comprehensive evaluation | | | | x | x |

From Examples, it can be understood that the polyamide resin composition of the invention of the present application has achieved low temperature toughness, blow molding properties such as mold transferability, suppression of burning, suppression of surface unevenness, drawdown property and dimensional stability of the blow molded product, and blister resistance in combination.

When Examples and Comparative Examples 1 and 4 are compared to each other, if the amount of the aliphatic copolymerized polyamide in the polyamide is less than 20% by mass, it can be understood that dimensional stability is inferior, and further there is a case where mold transferability is inferior, and among dimensional stability, the thickness of the welded portion is particularly thin.

When Examples and Comparative Example 2 are compared to each other, if the polyamide resin composition does not contain the impact resistant material and contains more than 20% by mass of the ionomer, dimensional stability and blister resistance are inferior.

When Examples and Comparative Example 3 are compared to each other, if the polyamide resin composition does not contain the ionomer and contains more than 20% by mass of the impact resistant material, burning of the inner surface of the molded product is not suppressed and dimensional stability is inferior.

When Examples and Comparative Example 5 are compared to each other, if the polyamide resin composition does not contain the impact resistant material and the ionomer, blow molding itself becomes impossible and low temperature toughness is also inferior.

Abbreviations in the Table are as follows.

(Polyamide Resin)

PA6: polyamide 6, relative viscosity: 4.08

PA6/66 (1): Polyamide 6/66, relative viscosity: 4.05, PA6 80 mol %, PA66 20 mol %

PA6/66 (2): Polyamide 6/66, relative viscosity: 4.05, PA6 85 mol %, PA66 15 mol %

PA6/66/12: Polyamide 6/66/12, relative viscosity: 4.05, PA6 80 mol %, PA66 10 mol %, PA12 10 mol %

Incidentally, the relative viscosity of the above-mentioned polyamide resin is a value in accordance with JIS K 6920, measured at 25 °C by dissolving 1 g of a polyamide resin in 100 ml of 96% concentrated sulfuric acid.

(Olefin-Based Ionomer)

Zn-EM Ionomer: Density 960 kg/m$^3$, the melting point 88 °C, MFR 0.9 g/10 min measured in accordance with JIS K7210 (1999) at 190 °C and a load of 2.16 kg, zinc content 3.4% by mass, ethylene-methacrylic acid copolymer, metal ion: zinc, product name “Himilan (Registered Trademark) 1706” available from Dow-Mitsui Polychemicals Co., Ltd.

(Impact Resistant Material)

MAH-EBR: maleic anhydride-modified ethylene-butene copolymer, product name “TAFMER (Registered Trademark) MH5020” available from Mitsui Chemicals, Inc., MFR: 0.6 g/10 min measured in accordance with ASTM D1238 at 190 °C and a load of 2.16 kg (Heat Resistant Agent)

Phenol-based 1: Phenol-based antioxidant (3,9-bis[2-[3-(3-t-butyl-4-hydroxy methylphenyl)propionyloxy]-1,1-dimethylethyl]-2,4,8,10-tetraoxaspiro[5.5]undecane), product name “Sumilizer (Registered Trademark) GA-80” available from Sumitomo Chemical Co., Ltd.

Phenol-based 2: Phenol-based antioxidant (pentaerythritol tetrakis[3-(3,5-di-t-butyl-4-hydroxyphenyl)propionate]), product name “Irganox (Registered Trademark) 1010” available from BASF Phosphorus-based 1: Phosphorus-based antioxidant (reaction product of biphenyl containing p,p,p',p'-tetrakis(2,4-di-t-butylphenoxy)-4,4' (or 3',4)-biphenyldiphosphine as a main component, phosphorus trichloride and 2,4-di-t-butylphenol), product name “Hostanox (Registered Trademark) P-EPQ (Registered Trademark)” available from Clariant Chemicals Co., Ltd.

Phosphorus-based 2: Phosphorus-based antioxidant (tris (2,4-di-t-butylphenyl)-phosphite), product name "Irgafos (Registered Trademark) 168" available from BASF

EXPLANATION OF REFERENCE NUMERALS

1 Shoulder portion
2 R portion
3 Body portion
4 Welded portion vicinity
5 Welded portion

The invention claimed is:

1. A tank comprising a blow molded product of a polyamide resin composition which comprises 60 to 85% by mass of a polyamide resin (A), 5 to 20% by mass of an olefin-based ionomer (B) and 5 to 20% by mass of an impact resistant material (C) in 100% by mass of the polyamide resin composition, wherein the polyamide resin (A) contains 80% by mass or more of an aliphatic copolymerized polyamide (A-1) in 100% by mass the polyamide resin (A), the impact resistant material (C) is at least one kind selected from the group consisting of (ethylene and/or propylene)/α-olefin-based copolymer modified by a carboxylic acid and/or a derivative thereof except a carboxylic acid metal salt, and/or an unsaturated carboxylic acid and/or a derivative thereof except an unsaturated carboxylic acid metal salt and (ethylene and/or propylene)/(α,β-unsaturated carboxylic acid and/or α,β-unsaturated carboxylic acid ester)-based copolymer modified or not modified by a carboxylic acid and/or a derivative thereof except a carboxylic acid metal salt, and/or an unsaturated carboxylic acid and/or a derivative thereof except an unsaturated carboxylic acid metal salt.

2. The tank according to claim 1, wherein the polyamide resin composition further comprises 0.1 to 3% by mass of a heat resistant agent (D).

3. The tank according to claim 1, wherein the aliphatic copolymerized polyamide (A-1) contains at least one kind selected from the group consisting of polyamide 6/66 and polyamide 6/66/12.

4. The tank according to claim 1, wherein a relative viscosity of the aliphatic copolymerized polyamide (A-1) measured in accordance with JIS K 6920 is 3.0 or more.

5. The tank according to claim 1, wherein an MFR of the olefin-based ionomer (B) measured in accordance with JIS K7210 (1999) at 190 °C and a load of 2.16 kg is 2 g/10 min or less.

6. The tank according to claim 1, wherein an MFR of the impact resistant material (C) measured in accordance with ASTM D1238 at 190 °C and a load of 2.16 kg is 2 g/10 min or less.

7. The tank according to claim 1, wherein the tank comes into contact with high-pressure gas.

8. The tank according to claim 1, wherein the impact resistant material (C) is at least one kind selected from the group consisting of (ethylene and/or propylene)/α-olefin-based copolymer which has a carboxy group, an acid anhydride group, a carboxylic acid ester group, a carboxylic acid imide group, a carboxylic acid amide group, or an epoxy group and (ethylene and/or propylene)/(α,β-unsaturated carboxylic acid and/or α,β-unsaturated carboxylic acid ester)-based copolymer which may have a carboxy group, an acid anhydride group, a carboxylic acid ester group, a carboxylic acid imide group, or a carboxylic acid amide group, or an epoxy group.

9. The tank according to claim 1, wherein the polyamide resin (A) does not contain an aromatic polyamide.

10. The tank according to claim 1, wherein the polyamide resin composition comprises 10 to 15% by mass of the olefin-based ionomer (B) in 100% by mass of the polyamide resin composition.

11. The tank according to claim 1, wherein the polyamide resin composition comprises 5 to 15% by mass of the impact resistant material (C) in 100% by mass of the polyamide resin composition.

12. A method of producing a tank comprising:

blow molding a polyamide resin composition which comprises 60 to 85% by mass of a polyamide resin (A), 5 to 20% by mass of an olefin-based ionomer (B) and 5 to 20% by mass of an impact resistant material (C) in 100% by mass of the polyamide resin composition, wherein the polyamide resin (A) contains 80% by mass or more of an aliphatic copolymerized polyamide (A-1) in 100% by mass the polyamide resin (A), and the impact resistant material (C) is at least one kind selected from the group consisting of (ethylene and/or propylene)/α-olefin-based copolymer modified by a carboxylic acid and/or a derivative thereof except a carboxylic acid metal salt, and/or an unsaturated carboxylic acid and/or a derivative thereof except an unsaturated carboxylic acid metal salt and (ethylene and/or propylene)/(α,β-unsaturated carboxylic acid and/or α,β-unsaturated carboxylic acid ester)-based copolymer modified or not modified by a carboxylic acid and/or a derivative thereof except a carboxylic acid metal salt, and/or an unsaturated carboxylic acid and/or a derivative thereof except an unsaturated carboxylic acid metal salt.

* * * * *